UNITED STATES PATENT OFFICE.

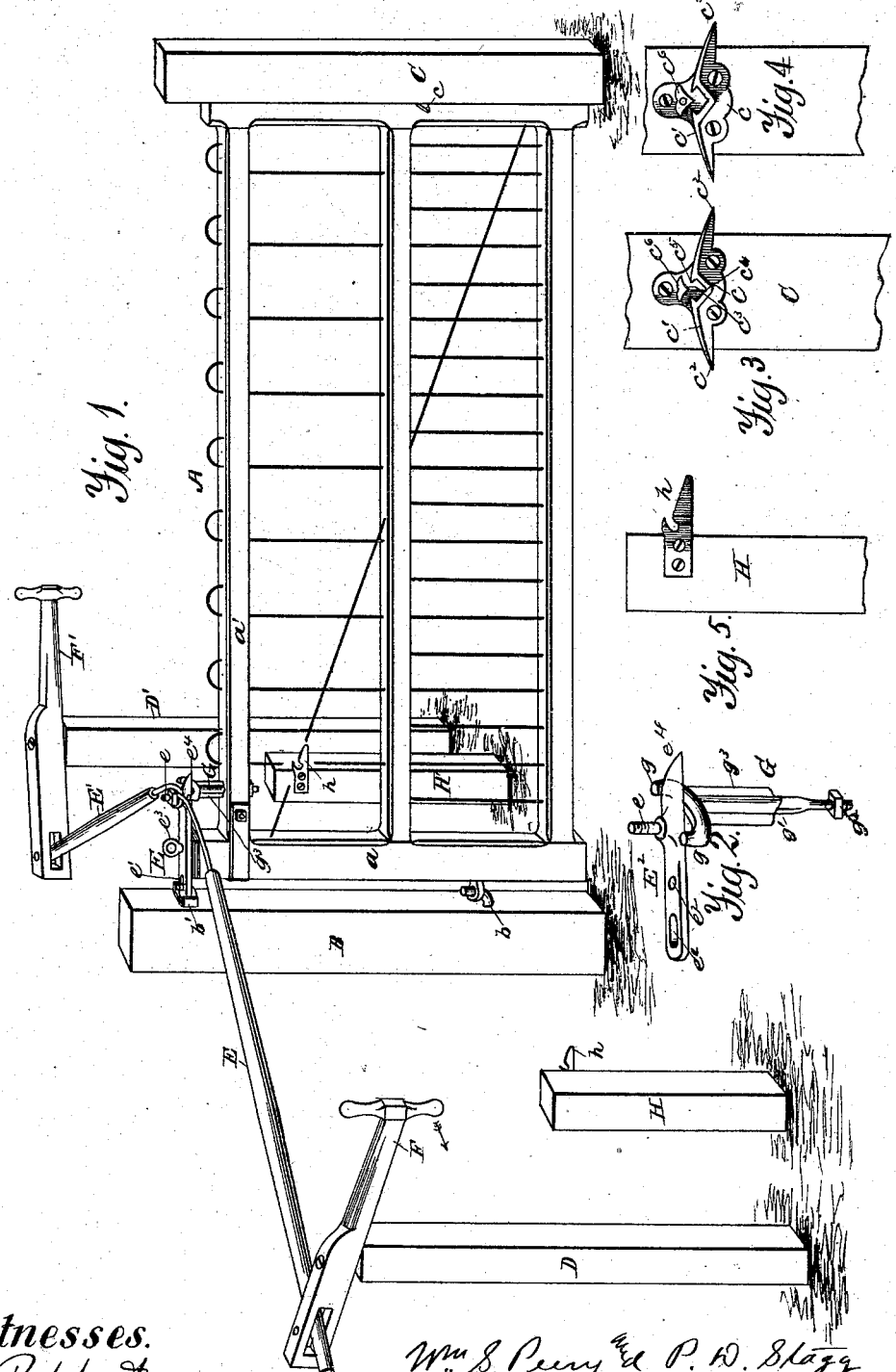

WILLIAM S. PEERY AND PHILIP D. STAGG, OF GREENSBURG, INDIANA.

SWINGING GATE.

SPECIFICATION forming part of Letters Patent No. 263,210, dated August 22, 1882.

Application filed April 18, 1881. (No model.)

*To all whom it may concern:*

Be it known that we, WM. S. PEERY and PHILIP D. STAGG, citizens of the United States, residing at Greensburg, in the county of Decatur and State of Indiana, have invented certain new and useful Improvements in Swinging Gates; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to improvements upon our invention patented to us January 18, 1881, No. 236,694; and it consists of the construction and combination of parts, as hereinafter more fully described, and particularly pointed out in the claims.

In the drawings, Figure 1 represents a perspective view of a gate provided with our improvements. Fig. 2 is a perspective view of the lever forming the upper hinge of the gate with the stop or stops for limiting the lateral movement of the same. Fig. 3 represents a view of the gate-catch. Fig. 4 is a modification of the same; and Fig. 5 represents a portion of the post and catch for holding the gate when open.

Similar letters of reference in the several drawings denote similar parts.

Referring to the drawings, A represents a gate, pivoted to the post B at the points $b\ b'$. C represents the front gate-post, provided with a suitable catch, $c$, for holding the gate when closed.

D D' are upright posts fixed in the ground at each side of and about two feet or more to rear of post B.

To the tops of the posts D D' are fulcrumed the levers F F', the outer ends of which are connected by rods E E' to a stud, $e$, projecting upwardly from the top of a short lever, $E^2$, near the outer or free end thereof. The lever $E^2$ is provided at its rear end with a slot, $e'$, into which the hook of the upper hinge, $b'$, takes, as shown. The lever $E^2$ is further provided with an aperture, $e^2$, for the passage of a suitable pin, $e^3$, that pivots said lever to the top of the rear upright stile, $a$, of the gate.

So far as described, the construction of the parts of the present invention does not differ from that shown and described in Letters Patent No. 236,694, granted to us January 18, 1881, and bearing that date.

We will now proceed to describe the parts we consider new, and which we desire to protect by Letters Patent.

The outer or free end of the lever $E^2$ projects outwardly beyond the stud $e$, as shown at $e^4$, the said projecting portion resting upon or within the upwardly-turned arms $g$ of a support, G, provided at its lower central portion with a shank, $g'$, that extends through the top rail, $a'$, of the gate, near the rear end thereof. The support is firmly secured to the rail by means of a screw and nut, $g^2$. Ribs $g^3$, cast upon the shank $g'$ and between the rail and arms $g$ keep the latter at the proper distance from said rail.

The catch $c$, attached to the front gate-post, is formed in one piece, and is provided with a projecting flange, $c'$, the upper surface of which is slightly convex. The ends $c^2$ of the catch project outward beyond the body of the same to receive and direct the rigid latch upon the gate (not shown) to and into a recess, $c^3$, the sides of which are inclined upwardly from a point, $c^4$, as shown, and provided near their upper ends with short sides $c^5$, parallel to the inclined sides before described.

Directly above the recess $c^3$ is a triangular-shaped block, $c^6$, the lower sides of which form an obtuse angle each with the other, the said sides being slightly concave, and bearing the same relative position to the recess as shown. It will be observed that the apex of the angle formed by the two lower sides of the said block $c^6$ is directly in line with the center of the recess and nearly in line with the curvature of the part $c'$, said construction being found by experiment to be the most practical and best for the proper retention of the latch within the recess.

In the modification shown in Fig. 4 the block $c^6$ is pivoted to the casting $c$. In this form the apex of the angle formed by the two lower sides is below the line of curvature formed by the part $c'$, and consequently when the latch is within the recess formed in the latter the pivoted block will swing, and thus present one of the curved sides to the upper surface of the latch, as will be readily understood.

H H' represent two upright posts, fixed in the ground near the posts D D', and provided with catches $h$ $h'$ to receive and hold the latch of the gate when the latter is opened.

The operation of our improved swinging gate is as follows: When it is desired to open the gate one of the levers—as, for instance, F—is drawn outward in the direction indicated by the arrow. This will cause the opposite end of the said lever to move, through the medium of the connecting-rod E, the outer or free end of the hinge-lever around as far as is permitted by the projections upon arms $g$ of the support G, which action operates to swing the upper end of the rail $a$ of the gate, together with the top rail, $a'$, of the same, outward, and consequently beyond the center of gravity of said rail $a$, while at the same time the forward end of the gate is slightly raised, thus releasing the latch from the catch $c$. The gate, now being free from said catch, will swing around or open, as will be readily understood. To close the gate it is only necessary to reverse the action described above.

It will be understood that the gate may be operated from either side, or opened from the one side and closed from the other.

Having thus described our invention, what we claim, and desire to secure by Letters Patent, is—

1. In a swinging gate, the combination of the lever $E^2$, provided with the slot $e'$, aperture $c^2$, stud $e$, and projection $e^4$, with the upper hinge-hook $b'$ in the post B, end rail, $a$, of the gate A, and the support G, having the upwardly-turned arms $g$, substantially as described.

2. In a swinging gate, the support G, having the arms $g$, at right angles to and turned upwardly from a straight downwardly-projecting ribbed shank, $g'$, provided at its lower end with the screw and nut $g^2$, whereby to secure the support to the top rail, $a'$, of the gate, substantially as described.

3. In a swinging gate, the triangular-shaped block $c^6$, having two concave faces, as shown, cast or otherwise secured to the catch $c$, the latter having convex flanges $c'$ and recesses $c^3$ $c^4$ $c^5$, the lower end of said block $c^6$ extending down to or below a horizontal line drawn across the top of the recesses in the catch, as and for the purpose set forth.

In testimony whereof we affix our signatures in presence of two witnesses.

WM. S. PEERY.
PHILIP D. STAGG.

Witnesses:
 ALMON S. CREATH,
 CHRIS. SHANE.